US012717982B2

(12) United States Patent
Leynaud et al.

(10) Patent No.: US 12,717,982 B2
(45) Date of Patent: Aug. 25, 2026

(54) ESTABLISHMENT OF A DESIGN-BASIS SPECIFICATION FOR A DEVICE FOR A TURBOMACHINE STRUCTURE

(71) Applicant: Safran Aircraft Engines, Paris (FR)

(72) Inventors: Robin Leynaud, Moissy-Cramayel (FR); Serge Benyamin, Moissy-Cramayel (FR); Nicolas Perron, Moissy-Cramayel (FR); Benjamin Petard, Moissy-Cramayel (FR); Florian Poinsot-Berthelot, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 361 days.

(21) Appl. No.: 16/650,347

(22) PCT Filed: Sep. 25, 2018

(86) PCT No.: PCT/FR2018/052355
§ 371 (c)(1),
(2) Date: Mar. 24, 2020

(87) PCT Pub. No.: WO2019/058085
PCT Pub. Date: Mar. 28, 2019

(65) Prior Publication Data

US 2020/0233990 A1 Jul. 23, 2020

(30) Foreign Application Priority Data

Sep. 25, 2017 (FR) ....................................... 1758822

(51) Int. Cl.

| | |
|---|---|
| ***G06F 30/15*** | (2020.01) |
| ***G06F 30/23*** | (2020.01) |
| *G06F 119/18* | (2020.01) |

(52) U.S. Cl.
CPC .............. *G06F 30/15* (2020.01); *G06F 30/23* (2020.01); *G06F 2119/18* (2020.01)

(58) Field of Classification Search
CPC ....... G06F 30/15; G06F 30/23; G06F 2119/18
See application file for complete search history.

(56) References Cited

U.S. PATENT DOCUMENTS

| | | | |
|---|---|---|---|
| 2004/0243310 | A1 | 12/2004 | Griffin et al. |
| 2010/0004799 | A1 | 1/2010 | Drouin, Jr. et al. |

(Continued)

FOREIGN PATENT DOCUMENTS

| | | | |
|---|---|---|---|
| CN | 104362916 | A | 2/2015 |
| CN | 106649937 | A | 5/2017 |

(Continued)

OTHER PUBLICATIONS

ReStackor, "Spring-Mass-Damper Motorcycle Suspension Tuning", accessed via the WayBack Machine, archived in 2015, URL: www(dot)shimrestackor(dot)com/Physics/Spring_Mass_Damper/spring-mass-damper(dot)html (Year: 2015).*

(Continued)

*Primary Examiner* — David A Hopkins
(74) *Attorney, Agent, or Firm* — Bookoff McAndrews, PLLC

(57) ABSTRACT

Method for establishing a sizing specification for an equipment intended to be mounted on a turbomachine structure such as a casing, the method comprising the following steps:

selecting (S8) an incident likely to occur on the structure, such as the loss of a rotor element of the turbomachine;

simulating (S14) the presence of the equipment on the structure, at an attachment point, by means of a mechanical oscillator having at least a natural frequency ($f_0$) and at least a damping rate ($\xi$);

varying the natural frequency and/or damping rate according to at least two values;

(Continued)

determining (S18) a sizing acceleration for the mechanical oscillator in response to the incident for each of said values of the natural frequency and damping rate;

delivering (S20) the specification comprising the sizing accelerations and the corresponding natural frequency and damping rate values.

19 Claims, 2 Drawing Sheets

(56) References Cited

U.S. PATENT DOCUMENTS

| | | | | |
|---|---|---|---|---|
| 2011/0046933 | A1 | 2/2011 | Skelly et al. | |
| 2011/0224952 | A1* | 9/2011 | Marasco | G06F 30/15 703/1 |
| 2012/0239358 | A1* | 9/2012 | Yiu | G06F 30/23 703/2 |
| 2013/0060538 | A1* | 3/2013 | Perez Garraleta | G06F 30/20 703/2 |
| 2016/0283623 | A1 | 9/2016 | Mare et al. | |

FOREIGN PATENT DOCUMENTS

| | | | |
|---|---|---|---|
| CN | 106663132 | A | 5/2017 |
| CN | 106991216 | A | 7/2017 |
| CN | 107849998 | A | 3/2018 |
| FR | 2845126 | | 9/2002 |
| FR | 2976623 | | 6/2011 |
| WO | 2016170063 | A1 | 10/2016 |

OTHER PUBLICATIONS

Hozic, "Mechanical loads on a turbofan engine structure at blade-off", Master's Thesis, 2009, Luleå University of Technology (Year: 2009).*

Sengoz et al., "Development of a Generic Gas Turbine Engine Fan Blade-out Full-Fan Rig Model", United States Federal Aviation Administration, Aug. 2015, Report No. DOT/FAA/TC-14/43 (Year: 2015).*

Yu, Pingchao, et al. "Dynamic modeling and vibration characteristics analysis of the aero-engine dual-rotor system with Fan blade out." Mechanical Systems and Signal Processing 106 (2018): 158-175. (Year: 2018).*

Avila, Suzana M., et al. "Numerical modeling of the dynamic behavior of a wind turbine tower." 11th International Conference Vibration Problems, Lisbon, Portugal. 2013. (Year: 2013).*

Yang, Bin. "Blade containment evaluation of civil aircraft engines." Chinese Journal of Aeronautics 26.1 (2013): 9-16. See the abstract, § 2 , and § 3.2 including p. 12, ¶3, see § 4.2 (Year: 2013).*

Husband, Jason Burkley. Developing an efficient FEM structural simulation of a fan blade off test in a turbofan jet engine. Diss. University of Saskatchewan, 2007. (Year: 2007).*

Luis San Andres, "MEEN 617 Notes: Handout 2a", Texas A&M University, 2008 URL: rotorlab(dot)tamu(dot)edu/me617/handout2a_2008(dot)pdf (Year: 2008).*

Heidari, Mohammad, et al. "An efficient multi-disciplinary simulation of engine fan-blade out event using MD Nastran." 49th AIAA/ASME/ASCE/AHS/ASC Structures, Structural Dynamics, and Materials Conference, 2008. See the abstract and pp. 2-4 (Year: 2008).*

Swanson, Douglas A., Henry T. Wu, and Hashem Ashrafiuon. "Optimization of aircraft engine suspension systems." Journal of aircraft 30.6 (1993): 979-984. See the abstract and p. 980 (Year: 1993).*

Stallone, M. J., et al. "Blade loss transient dynamic analysis of turbomachinery." AIAA journal 21.8 (1983): 1134-1138. See the abstract, the introduction, and the section "Analytical Approach" (Year: 1983).*

Sinha, Sunil K., and Sreekanth Dorbala. "Dynamic loads in the fan containment structure of a turbofan engine." Journal of Aerospace Engineering 22.3 (2009): 260-269. See the abstract and pp. 263, 267-269 (Year: 2009).*

Ramanadham, Koti Satish, et al. "A study of multiple techniques to simulate blade out event." Gas Turbine India Conference. vol. 58516. American Society of Mechanical Engineers, 2017. See the abstract and introduction (Year: 2017).*

Ivanov, Ilya Igorevich, and Boris Solomonovich Blinnik. "Dynamic loads acting on engine frame elements after fan blade out event study." 29th Congress of the International Council of the Aeronautical Science, St. Petersburg, Russia. 2014. See the abstract and § 2 (Year: 2014).*

Nasr, M., and Tim Moffat. "A design methodology for fan blade-off based on structural failure." Report ISABE-2009-1103, Proceedings, 19 Conference ISABE, Montreal, Canada, 2009. See the abstract (Year: 2009).*

LS-DYNA, "LS-DYNA Aerospace Working Group Modeling Guidelines Document", Aug. 30, 2013. URL: www(dot)predictiveengineering(dot)com/sites/default/files/awg_ls-dyna_modeling_guidelings_document_v13-1(dot)pdf—See § 5.7 and its subsections starting on p. 116 (Year: 2013).*

Brown, Course Notes for Introduction to Dynamics and Vibrations, § 5.3: "Free vibration of a damped, single degree of freedom, linear spring mass system.", accessed via WayBack Machine, Mar. 18, 2015 archive date (Year: 2015).*

US Federal Aviation Administration (hereinafter FAA), Advisory Circular AC 25-24—Sustained Engine Imbalance, 2000, URL: faa(dot)gov/regulations_policies/advisory_circulars/index(dot)cfm/go/document(dot)information/documentID/22651 (Year: 2000).*

European Aviation Safety Agency, "Certification Specifications for Engines", Dec. 2009, Amendment 2 for "AMC E 520 (c)(1)", URL: easa(dot)europa(dot)eu/sites/default/files/dfu/agency-measures-docs-certification-specifications-CS-E-CS-E_Amendment-2(dot)pdf (Year: 2009).*

Cosme, Nicolas, et al. "Prediction of engine loads and damages due to fan blade off event." 43rd AIAA/ASME/ASCE/AHS/ASC Structures, Structural Dynamics, and Materials Conference. 2002. (Year: 2002).*

Sheridan, W. et al., "Design Optimization Study of Isolation Mount Systems for Gas Turbine Engine Accessories", *Proceedings of GT2005*, (Jun. 6-9, 2005), pp. 361-371.

International Search Report and Written Opinion dated Feb. 13, 2019, in corresponding PCT application No. PCT/FR2018/052355 (18 pages).

Translation of Office Action issued in corresponding Chinese Application No. 201880064440 on Jan. 20, 2023 (11 pages).

Decision to grant issued in corresponding application No. CN201880064440 A, mailed Dec. 21, 2023.

* cited by examiner

ESTABLISHMENT OF A DESIGN-BASIS SPECIFICATION FOR A DEVICE FOR A TURBOMACHINE STRUCTURE

CROSS-REFERENCE TO RELATED APPLICATION(S)

This patent application is the U.S. National Phase Entry under 35 U.S.C. § 371 of International Application No. PCT/FR2018/052355, filed on Sep. 25, 2018, which claims priority to French Patent Application No. 1758822, filed on Sep. 25, 2017.

FIELD OF THE INVENTION

The present disclosure relates to the general field of equipment sizing, and more particularly to a method for establishing a sizing specification for an equipment intended to be mounted on a turbomachine structure. The present disclosure also relates to methods for sizing and manufacturing equipment for a turbomachine.

TECHNOLOGICAL BACKGROUND

During the development of a turbomachine, for example in the field of aeronautics, the design of the structures of the turbomachine and the design of the equipment intended to be mounted on these structures are generally carried out by different teams. The team in charge of the overall dynamics of a structure, such as the nacelle or the casing of the turbomachine, provides the team in charge of the sizing of equipment with a specification, called sizing specification, which defines the forces or displacements that the equipment must withstand. Thus, the sizing specification is assumed to be representative of the conditions to which the equipment will be subjected during the operation of the turbomachine.

Conventionally, at least the most severe events likely to occur in the turbomachine are taken into account in the specification. For each event, the specification comprises a static equivalent of the maximum acceleration of the structure at the point where the equipment is intended to be attached. The team in charge of the sizing of the equipment, also called equipment manufacturer, can then apply this acceleration equivalent to his equipment and size the latter in order to optimize its holding.

However, such a method is based on static calculations from a dynamic data such as the acceleration. This method therefore induces significant margins on the sizing, is not representative of the real physical phenomena and takes into account neither the couplings between the structure and the equipment, nor the different possible phases of an incident. In order to be able to size the equipment as accurately as possible and reduce its mass, there is therefore a need for a new type of method for establishing a specification.

PRESENTATION OF THE INVENTION

To this end, the present disclosure relates to a method for establishing a sizing specification for an equipment intended to be mounted on a turbomachine structure such as a casing, the method comprising the following steps:

- selecting an incident likely to occur on the structure, such as the loss of a rotor element of the turbomachine;
- simulating the presence of the equipment on the structure, at an attachment point, by means of a mechanical oscillator having at least a natural frequency and at least a damping rate;
- varying the natural frequency and/or damping rate according to at least two values;
- determining a sizing acceleration for the mechanical oscillator in response to the incident for each of said values of the natural frequency and damping rate;
- delivering the specification comprising the sizing accelerations and the corresponding natural frequency and damping rate values.

The structure may be, in whole or in part, a nacelle, a casing, etc. The rotor element can be a blade, in particular a fan or turbine blade. The attachment point is the point of the structure to which the equipment is intended to be attached.

An incident likely to occur on the structure means a transient event likely to occur on the turbomachine and whose direct or indirect consequences would impact the structure, for example on a mechanical level.

Instead of simply determining the maximum acceleration at a point in the structure, the present method comprises the simulation step, in which the presence of the equipment is taken into account in the form of a mechanical oscillator having at least a natural frequency and at least a damping rate. The damping rate can be zero or non-zero. For example, the mechanical oscillator can be a damped harmonic oscillator. For example, the mechanical oscillator can be a damped mass-spring system having one degree of freedom.

It is understood that the specification comprises a plurality of sizing accelerations for the same attachment point: if only one natural frequency value is considered, then the specification comprises the sizing accelerations for at least two damping rate values, and vice versa.

By determining a sizing acceleration for the mechanical oscillator in response to the incident for at least two values of the natural frequency and/or damping rate, the present method allows taking into account the dynamic response of the equipment, modeled as an oscillator, and the coupling between the equipment and the structure, without significantly increasing the required calculation time. Once such a specification has been established, the equipment manufacturer has, at each attachment point, no longer a single acceleration value but a plurality of sizing accelerations, depending on the natural frequency and/or damping rate. The equipment manufacturer can therefore design the equipment and modify its natural frequency and/or damping rate so as to minimize the loading applied thereto and, consequently, optimize the mass of the equipment.

Thus, the present method proposes a paradigm shift in the design and exchange of information between the team in charge of the overall dynamics of the structure and the equipment manufacturer.

In some embodiments, the determination of the sizing acceleration is carried out by digital simulation. The structure can be modeled, as well as the mechanical oscillator, then the incident is simulated and the response is observed, for several values of the natural frequency and/or damping rate of the oscillator.

In some embodiments, the determination of the sizing acceleration is carried out by means of sensors, during a real test of said incident on the structure. The sensor can be an accelerometer. Such embodiments are more expensive but provide more realistic results.

In some embodiments, the incident comprises a shock on the structure, or even is a shock on the structure. A shock is a short and violent transient. For example, a shock can be modeled by a crenel function or a half-sine. The shock may be caused by the impact of the lost rotor element, for example a blade, on the structure. A shock induces a response from the structure, and therefore from the equipment, essentially at high frequency. Thus, in some embodiments, the maximum natural frequency value taken for the equipment can be greater than or equal to 200 Hertz, preferably to 400 Hertz, more preferably to 600 Hertz, more preferably to 800 Hertz, more preferably to 1 kiloHertz, more preferably to 2 kiloHertz, more preferably to 5 kiloHertz, more preferably to 10 kiloHertz.

In some embodiments, before determining the sizing accelerations, the structure is partitioned into a plurality of areas and the method comprises determining the sizing accelerations in at least two areas of said plurality. The partition of the structure can be performed so that the structure has, within each area, a homogeneous response to the incident. An area may be annular about the axis of the turbomachine. In the extreme, an area may correspond to a single point; in this case, each area is an attachment point. According to one example, the structure can be partitioned into areas in the axial and/or radial direction. Partitioning the structure into areas allows studying the impact of the incident for several envisaged positions of the equipment and giving this information to the equipment manufacturer, the equipment manufacturer being then able to choose the most favorable position for the holding of the equipment.

Within the meaning of the present disclosure, the axis of the turbomachine means the axis of rotation of the rotors of the turbomachine. The axial direction corresponds to the direction of the axis of the turbomachine and a radial direction is a direction perpendicular to this axis and intersecting this axis. Likewise, an axial plane is a plane containing the axis of the turbomachine and a radial plane is a plane perpendicular to this axis. A circumference is understood as a circle belonging to a radial plane and whose center belongs to the axis of the turbomachine. A tangential, circumferential or azimuthal direction is a direction tangent to a circumference; it is perpendicular to the axis of the turbomachine but does not pass through the axis.

In some embodiments, the sizing acceleration is a maximum acceleration of the oscillator, taken on all possible azimuths of the attachment point, in response to the incident, possibly increased by a predetermined margin. The axial and radial coordinates of the attachment point can be fixed. Preferably, the sizing acceleration is greater than or equal to the maximum acceleration.

As the incident can generally occur according to an axial symmetry, taking into account the maximum acceleration on all possible azimuths of the attachment point, that is to say the maximum, on said azimuths, of the accelerations, possibly increased by a predetermined margin, allows providing a conservative data in the specification.

In some embodiments, the sizing acceleration or the maximum acceleration is a radial acceleration. Indeed, the inventors have found that, for the most severe incidents, the most critical accelerations were radial, the tangential and axial accelerations being less significant for the sizing of the equipment.

In some embodiments, the mass of the equipment is less than or equal to 10% of the mass of the structure, preferably 5%, more preferably 2%, more preferably 1%. For example, the mass of the equipment may be low enough such that, whatever its natural frequency, the acceleration at the attachment point does not differ by more than 10% between the case where the equipment is present and the case where the equipment is absent. In these embodiments, it is reasonable to assume that the presence of the equipment does not modify the overall dynamics of the structure and not to take into account the mass of the equipment, other than in the mechanical oscillator implicitly, upon determination of the sizing acceleration. This simplifies the calculations and makes the method simpler and faster to implement. In addition, relatively light equipment is more sensitive to high frequency phenomena, typically greater than 1 kiloHertz, than at low frequency.

The present disclosure also relates to a method for sizing an equipment intended to be mounted on a turbomachine structure such as a casing, the method comprising obtaining a first specification established by the method described above and sizing the equipment on the basis of said first specification.

Within the meaning of the present disclosure and unless otherwise indicated, the mention of a "first" element, such as a first specification, does not necessarily imply the existence of a "second" element nor, if applicable, of an order relationship between the first and the second element. The ordinal qualifiers are, in this context, used for the sole purposes of clarity and identification, without prejudging particular characteristics.

The present disclosure also relates to the manufacture of the equipment thus sized.

Concerning the sizing method, in some embodiments, during the method for establishing the first specification, the determination of the sizing acceleration is carried out by digital simulation, and the sizing method further comprises manufacturing a specimen of the equipment thus sized and establishing a second specification according to the establishment method previously described, the determination of the sizing acceleration of the second specification being carried out by means of sensors, during a real test of said incident on the structure on which said specimen is mounted. The second specification can be used later to adjust the sizing of the equipment taking into account the actual response of the specimen manufactured in the incident. This adjustment can be carried out by resizing the equipment according to the sizing method described above, by replacing the first specification by the second specification. The establishment of the second specification is normally more accurate than that of the first specification insofar as the dynamics of the structure as measured by the sensors, typically accelerometers, necessarily takes into account the presence of the equipment with its mass and its other physical characteristics, which could be neglected upon determination of the sizing acceleration by digital simulation for the first specification.

The present disclosure also relates to a device for establishing a sizing specification for an equipment intended to be mounted on a turbomachine structure such as a casing, the device comprising:

- a module for selecting an incident likely to occur on the structure, such as the loss of a rotor element of the turbomachine;
- a module for simulating the presence of the equipment on the structure, at an attachment point, by means of a mechanical oscillator having at least a natural frequency and at least a damping rate;
- a variation module configured to vary the natural frequency and/or damping rate according to at least two values;
- a module for determining a sizing acceleration for the mechanical oscillator in response to the incident for each of said values of the natural frequency and damping rate;
- the determination module being configured to deliver the specification comprising the sizing accelerations and the corresponding natural frequency and damping rate values.

This device can be configured to implement the method for establishing a specification described above.

The present disclosure also relates to a method for manufacturing an equipment intended to be mounted on a turbomachine structure such as a casing, comprising:

obtaining a specification comprising sizing accelerations to which the equipment may be subjected, based on at least a natural frequency value and at least a damping rate value of said equipment;

sizing the equipment based on said specification;

manufacturing the equipment thus sized.

Such a method can be carried out by an equipment manufacturer and allows him, for the reasons indicated above, to size the equipment as accurately as possible, possibly by choosing the most favorable attachment point. Indeed, in some embodiments, the accelerations of the specification may further depend on the axial and/or radial position of the attachment point of the equipment on the structure.

In some embodiments, the sizing comprises a modal decomposition of the equipment, optionally by the finite element method, a calculation, for at least a natural mode of the equipment, of a field of maximum stresses in the equipment in response to the sizing accelerations and according to the specification, and the adaptation of the equipment to withstand said field of maximum stresses. Alternatively, in some cases, the sizing can be carried out analytically, by calculation.

In some embodiments, the calculation is performed for each natural mode of the equipment within a predetermined spectral range.

In some embodiments, the different steps of the method for establishing a specification are determined by computer program instructions. Consequently, the present disclosure also relates to a program including instructions for executing the steps of the method for establishing a specification previously described when said program is executed by a computer or by a microprocessor.

This program can use any programming language, and be in the form of a source code, an object code, or an intermediate code between source code and object code, such as in a partially compiled form, or in any other desirable form.

The present disclosure also relates to a computer-readable recording medium on which a computer program is recorded comprising instructions for executing the steps of the method for establishing a specification described above.

The information medium can be any entity or device capable of storing the program. For example, the medium can include a storage means, such as a ROM, for example a CD ROM or a microelectronic circuit ROM, or a magnetic recording means, for example a floppy disc or a hard disc.

On the other hand, the information medium can be a transmissible medium such as an electrical or optical signal, which can be routed via an electrical or optical cable, by radio or by other means. The program according to the invention can be particularly downloaded over an Internet type network.

The present disclosure also relates to an assembly method, comprising obtaining a turbomachine structure and an equipment obtained by the equipment manufacturing method as described above, and assembling the equipment on said structure.

BRIEF DESCRIPTION OF THE DRAWINGS

The invention and its advantages will be better understood upon reading the following detailed description of embodiments of the invention given by way of non-limiting examples. This description refers to the appended drawings, wherein.

DETAILED DESCRIPTION OF THE INVENTION

Figure 1:
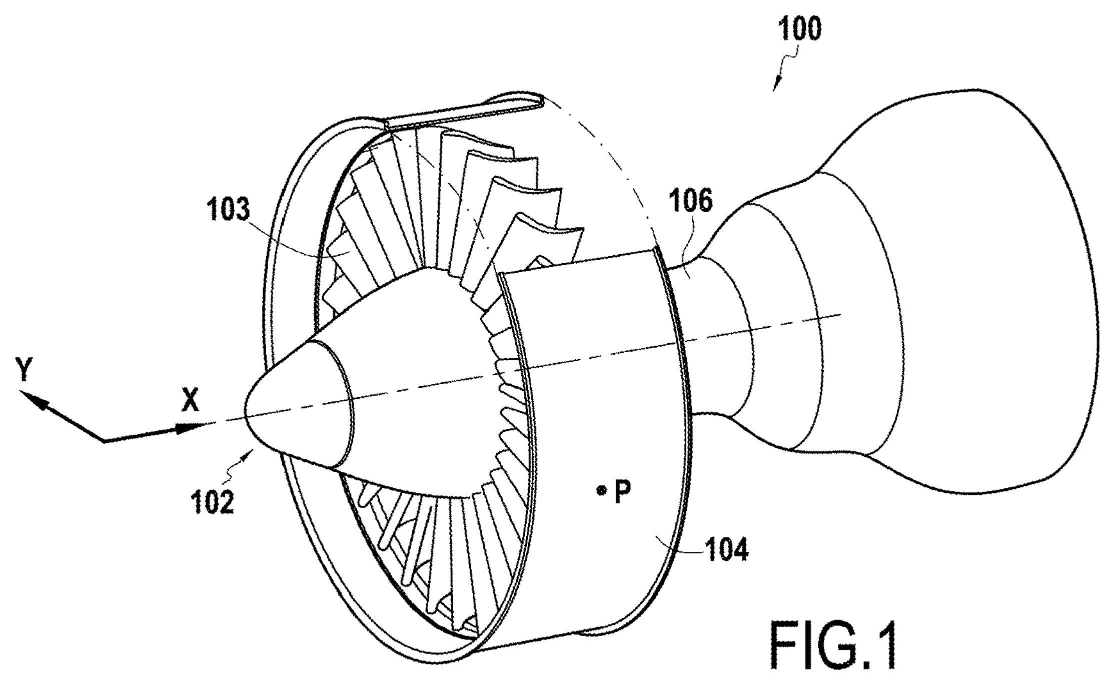
FIG. 1 represents schematically, partially and in perspective, a turbomachine according to one embodiment.

As indicated above, the present disclosure relates to the establishment of a sizing specification for an equipment intended to be mounted on a turbomachine structure such as the one schematically represented in FIG. 1. The turbomachine 100 of FIG. 1 comprises in particular a rotor 102 having a fan blading 103, a fan casing 104 surrounding the fan blading 103 and an intermediate casing 106 located axially downstream of the fan casing 104. The turbomachine has an axial direction X which is the axis of rotation of the rotor 102, and a radial direction Y. Thereafter, without loss of generality, the fan casing 104 will be taken as an example of a turbomachine structure on which equipment is intended to be mounted. More generally, the considered structure can be a structure relative to which the rotor 102 is in rotation and/or an annular structure around all or part, axially or circumferentially, of the rotor 102. The rotor 102 is likely, during its rotation, to lose one of its elements.

The equipment can be for example a pipe, in particular rigid pipe, a pipe support, a harness support, a support, an oil tank, an electronic regulator of the engine, an electronic housing, a fuel metering device, a pump, a heat exchanger, etc. The equipment can be mounted radially inside or, preferably, outside the turbomachine structure formed here by the fan casing 104.

Figure 2:
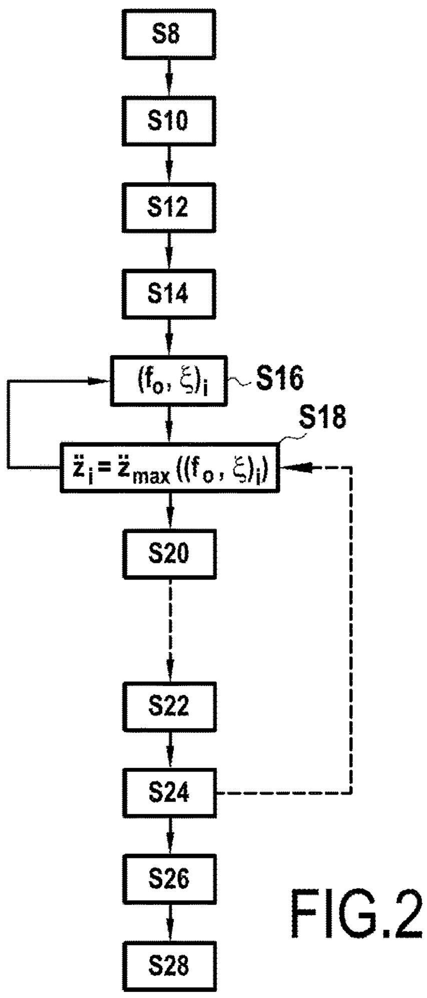
FIG. 2 is a block diagram representing the steps of an establishment, sizing, manufacturing method according to one embodiment.

FIG. 2 represents, in the form of a block diagram, several steps of a method for establishing a sizing specification, for sizing and manufacturing equipment intended to be mounted on the turbomachine 100.

In order to ensure the robustness of the turbomachine 100, the team in charge of the overall dynamics, for example a motorist, must provide the equipment manufacturer with a sizing specification for the considered equipment. This sizing specification must be expressed in a common language, that is to say the information it contains must be in a form that the engine manufacturer is able to express and that the equipment manufacturer is able to use, while remaining as accurate, complete and concise as possible.

Particularly, the engine manufacturer must provide the equipment manufacturer with information on the incidents that the equipment must withstand. In the example of the turbomachine 100, the most severe incident for equipment mounted on the fan casing 104 is a loss of blade from the fan blading 103 (also known as Fan Blade Out). Indeed, such a loss of blade would induce first a shock phase due to the impact of the blade on the fan casing 104 (beyond 1000 g over a duration less than or equal to three milliseconds, g being the acceleration of Earth's gravity), then a phase during which the equipment mounted on the fan casing 104 is excited by an unbalance force vibrating at the frequency of rotation of the rotor 102 and due to the imbalance resulting from the loss of the blade. Thus, more generally, the incident to which the fan casing 104 is subjected may comprise a shock and/or an excitation under rotating unbalance.

Thus, during a step S8, the engine manufacturer selects at least one incident likely to occur on the structure. In the context of the present disclosure, the incident will be a shock on the fan casing 104, due to the loss of a blade of the fan. However, the engine manufacturer could select another incident or additional incidents, for example a loss of blade of the high-pressure turbine, or the decoupled mode which, for engines equipped with decoupler booster as disclosed in particular in the patent documents FR 2 845 126 and FR 2 976 623, follows the shock of the blade on the casing in the accident of loss of fan blade.

In the case where the determination of sizing accelerations is carried out by digital simulation (as will be detailed below), the method can comprise a step S10 of modeling the fan casing 104. The modeling can be carried out by means of finite elements or another method known per se to those skilled in the art. Alternatively, it is possible, in step S10, to obtain a structure model made previously.

Optionally, in step S12, the modeled structure can be divided or partitioned into a plurality of areas. A partition designates a particular division covering the entire structure and such that no area overlaps another area. An area can correspond to an annular portion of the structure. Two areas can also be radially separated, for example when the question of mounting equipment inside or outside the fan casing 104 arises.

Figure 3:
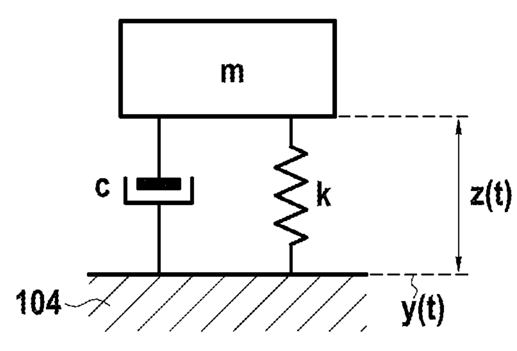
FIG. 3 represents schematically a mechanical oscillator according to one embodiment.

In step S14, the presence of the equipment on the structure at least at one attachment point P (see FIG. 1) is simulated, by means of a mechanical oscillator 108. The mechanical oscillator has at least a natural frequency and at least a damping rate. For example, the mechanical oscillator 108 may be of the type represented in FIG. 3. As illustrated in FIG. 3, the attachment point P may be the sole attachment point of the equipment, that is to say the equipment is free from any other mechanically binding attachment during the incident and has no other attachment to another component than the structure 104; therefore, from a mechanical point of view, the equipment is "at the end of the chain". Furthermore, FIG. 3 represents a mass m, assumed to be punctual, connected to a support, here the structure, by a stiffness spring k and a damper of damping coefficient c. In this case, the mechanical oscillator 108 is a damped harmonic oscillator. The mass m is identified by its position z(t) relative to its rest position. Conventionally, the equation of this movement can be reduced in the form:

$$\ddot{z}(t)+2\xi\omega_0\dot{z}(t)+\omega_0^2 z(t)=\ddot{y}(t),$$

where $\dot{z}$ is the first derivative of z with respect to time, i.e. the speed of the mass m, and $\ddot{z}$ is the second derivative of z with respect to time, i.e. the acceleration of the mass m, the constants $\omega_0$ and $\xi$, which are respectively the natural pulse and the damping rate of the mechanical oscillator 108, are defined as a function of the variables m, k and c, and $\ddot{y}$ is the acceleration of the fan casing 104 at the attachment point P. Thus, the mechanical oscillator 108 has a natural frequency $f_0$, connected to the natural pulse by the relation $\omega_0=2\pi f_0$, and a damping rate $\xi$. In addition, the data of these two variables suffice to define the mechanical oscillator 108, it is not necessary to explicitly define a mass m, a stiffness k and a damping coefficient c. it is also noted that the equation above is linear, which simplifies the calculations and makes the method faster to implement.

In this embodiment, the mechanical oscillator 108 is unidirectional, that is to say it has only one degree of freedom. This is justified by the fact that, in the present case, the incident results in an essentially radial load of the structure (of the fan casing 104), and the forces on the equipment will be essentially radial. Thus, there is only interest in the radial acceleration of the equipment, therefore in the radial acceleration $\ddot{z}$ of the mechanical oscillator 108. However, it is possible to consider a multidirectional mechanical oscillator and to take into account the movement of the mass m in several directions, for example not only the radial direction but also the axial and tangential directions.

The presence of the mechanical oscillator 108 is taken into account by solving the above differential equation. An analytical solution to this equation is known and the resolution of this problem is within the reach of those skilled in the art. However, it will be noted that the accelerations $\ddot{y}(t)$, which require having obtained, by measurement or simulation, the dynamic response of the casing in response to the incident, being generally available in discrete and non-continuous form, it is necessary to use discretization. In the discretization, in order to save calculation time, it can be advantageous to use a variable time step, in particular as soon as the discretization of the excitation $\ddot{y}$.

In step S16, the natural frequency $f_0$ and/or the damping rate $\xi$ is varied according to at least two values. According to one example, the damping rate can vary between 1% and 20%, or even up to 50%, depending, in particular, on the material of the structure. The variation of the natural frequency and/or the damping rate can correspond, for the equipment manufacturer, to considering two different designs for the considered equipment, since a change in natural frequency and/or damping coefficient changes, implicitly, the mass, the stiffness and/or the damping coefficient of the equipment. At least two pairs of values $(f_0, \xi)_i$ are thus given, at least one of the values varying for each index i.

For each of these pairs of values, in step S18, a sizing acceleration of the mechanical oscillator 108 is determined at the attachment point P. For example, using a digital simulation, the modeled structure and the mechanical oscillator 108 is subjected to the selected incident, and the maximum acceleration $\ddot{z}_{max}$ is deduced therefrom. The selected incident can be modeled as a half sine, that is to say a sine function over a half period, of constant sign representing the shock of the fan blade 103 on the fan casing 104, therefore the acceleration $\ddot{y}$ of the fan casing 104 to the point of the shock.

In this embodiment, in order to maintain a certain safety margin, the maximum radial acceleration $\ddot{z}_{max}$ increased by a predetermined margin is taken as the sizing acceleration. The margin can be taken in the form of an additive and/or multiplicative coefficient.

Figure 4:
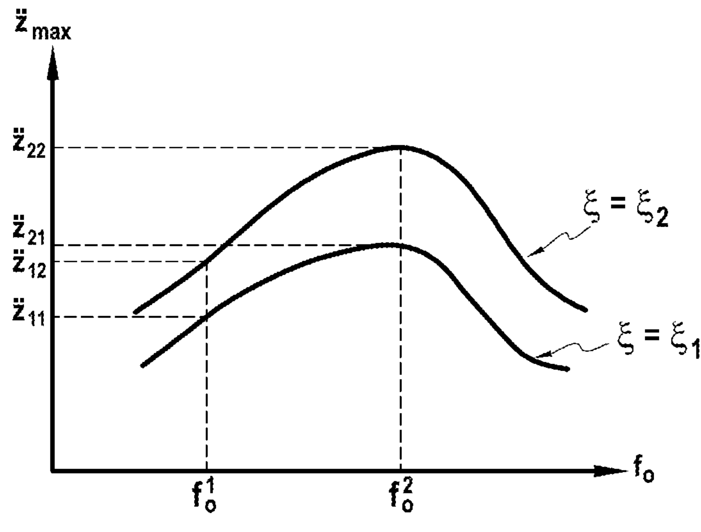
FIG. 4 is a graph illustrating a sizing specification according to one embodiment.

As illustrated in FIG. 2, step S18 is iterated for each pair of values $(f_0, \xi)_i$. Thus, this gives a graph of the type of the one represented in FIG. 4 and presenting, for each natural frequency and each damping rate (here two natural frequencies $$f_0^1, f_0^2$$

and two damping rates $\xi^1$, $\xi^2$), the corresponding sizing acceleration $\ddot{z}_{dim}$. If more values are studied, it is possible to obtain curves such as those illustrated in FIG. 4. In addition, these data can also be represented in three dimensions, for example in the form of a surface layer. The curve representing the sizing acceleration as a function of the natural frequency is sometimes called spectral response. In addition, it is possible to obtain the graph of FIG. 4 for several of the previously defined areas, or for several attachment points, when several positions are considered to mount the equipment on the structure, in particular several axial or radial positions.

Having obtained this result, the engine manufacturer can deliver to the equipment manufacturer, in step S20, a specification comprising the sizing accelerations and the corresponding natural frequency and damping coefficient values. For example, the specification may comprise the table of values serving as a basis for the graphic representation of FIG. 4, and/or this graphic representation. When the engine manufacturer has studied several incidents, the delivered specification may comprise, for each natural frequency and each damping rate, the maximum sizing acceleration for all the studied incidents.

For its part, in step S22, the equipment manufacturer obtains a specification comprising sizing accelerations to which the equipment may be subjected, as a function of at least a natural frequency value and at least a damping coefficient value of said equipment. The specification obtained in step S22 can be the one delivered in step S20 by the engine manufacturer, as illustrated in FIG. 2.

With this specification, the equipment manufacturer can size the equipment (step S24). The specification is enriched compared to what was available in the state of the art: instead of having only the maximum acceleration of the structure, which is a boundary condition, the equipment manufacturer now has the sizing acceleration for the equipment itself, for several values of the natural frequency and damping rate. The equipment manufacturer can therefore design the equipment, calculate its natural frequency and its damping, verify that the equipment sufficiently withstands the sizing acceleration resulting from the specification for this natural frequency and this damping, and iteratively adjust the design of his equipment based on this verification.

In practice, real systems rarely have a single natural mode. However, it is possible to boil down to oscillators with only one degree of freedom, for example by using the method known as method of the modal decomposition. In this method, the different natural modes of the equipment are calculated and as many corresponding natural frequencies are obtained. Then, the use of the sizing specification allows obtaining, for each natural frequency and/or damping rate, the sizing acceleration linked to this natural mode. An estimation of the maximum response of the equipment can then be obtained by performing an approximation which consists of adding the maximum response of each of the modes. For example, for an implementation using the finite elements, this approximation is, in each node j, of the form:

$$z_{j,dim} \cong \sqrt{\sum_{i=1}^{N} (\phi_{ij}\eta_{idim})^2}$$

where $z_{j,dim}$ is the sizing displacement at the node j of the equipment, $\eta_{i\ dim}$ is the sizing displacement for the pair of values $(f_0, \xi)_i$ obtained from the sizing specification, and $\phi_{ij}$ is the component of the natural mode i at the node j. The data of the sizing displacements, which are by definition greater than the maximum displacements, allows deriving the maximum stresses in the equipment with the desired margin.

In addition, there are other approximations allowing to determine the sizing displacement $z_{j,dim}$ from sizing displacements $\eta_{i\ dim}$ of each natural mode. In addition, by analogy, it is possible to add not only the contributions of the different natural modes, but also the contributions of the different directions in which the load of the incident applies.

In any event, it is noted that such a method requires only one calculation of finite elements, which is the modal decomposition of the equipment. Such a method therefore allows taking into account dynamic sizing data, coming from the sizing specification, with a reduced calculation time.

Thus, more generally, the sizing of the equipment comprises a modal decomposition of the equipment, optionally by the finite element method, a calculation, for at least a natural mode of the equipment, of a field of maximum stresses in the equipment in response to the sizing accelerations and according to the specification, and the adaptation of the equipment to withstand said field of maximum stresses. The calculation of the field of stresses can be carried out for each natural mode in a predetermined spectral range, whereby the calculations are limited to the natural modes that are determining and/or really likely to be requested taking into account the nature of the studied incident.

Due to the demanding constraints in the aeronautical field, the equipment manufacturer can, after having sized his equipment in step S24, provide the result of this design to the engine manufacturer who can, on this basis, calculate new sizing accelerations taking into account the equipment more accurately. As indicated above, obtaining a second sizing specification (step S18) can be carried out on the basis of a digital simulation, but preferably on the basis of physical tests (real tests) in which a specimen of the equipment is mounted on the structure. The method can then continue as previously disclosed.

The equipment manufacturer can also ask the engine manufacturer for additional specification, for example on some ranges of natural frequencies or damping rates.

Once the sizing is complete, the equipment can be manufactured (S26) and then assembled to the structure (S28) at the selected attachment point.

Figure 5:
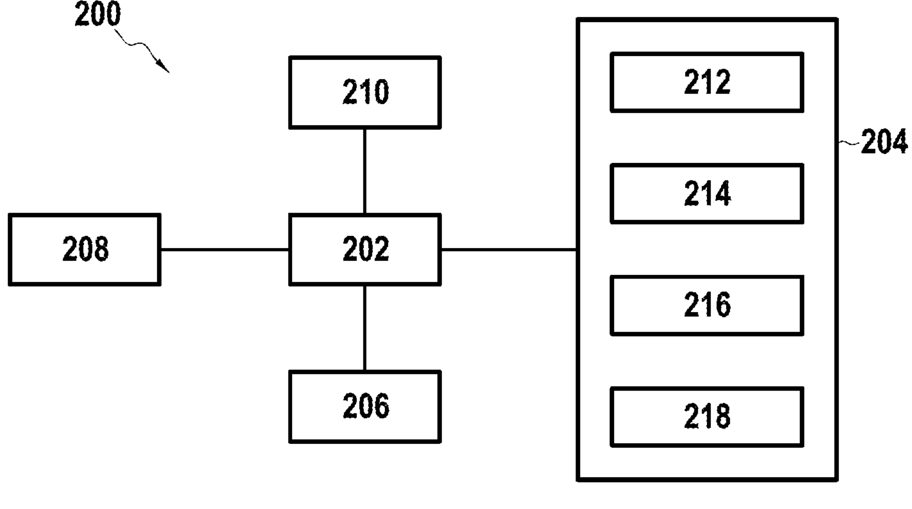
FIG. 5 represents schematically a device for establishing a sizing specification according to one embodiment.

The method for establishing a sizing specification can be implemented using a device for establishing a sizing specification (hereinafter establishment device), one embodiment of which is represented in FIG. 5.

The establishment device 200 here has the hardware architecture of a computer. It includes in particular a processor 202, a read-only memory 204, a random access memory 206, a non-volatile memory 208 and communication means 210, for example a user interface for entering the parameters such as the ranges of variation of the natural frequency and/or damping rate.

The read-only memory 204 of the estimation device 200 constitutes a recording medium, readable by the processor 202 and on which a computer program is recorded, including instructions for the execution of the steps of a method for establishing a sizing specification as previously described with reference to FIG. 2.

This computer program defines, in an equivalent manner, functional modules of the estimation device 200 able to implement the steps of the estimation method according to the invention. Thus, in particular, this computer program defines a selection module 212 for an incident likely to occur on the structure, such as the loss of a rotor element of the turbomachine; a module 214 for simulating the presence of the equipment on the structure, at an attachment point, by means of a mechanical oscillator having at least a natural frequency and at least a damping coefficient; a variation module 216 configured to vary the natural frequency and/or damping coefficient according to at least two values; a module 218 for determining a sizing acceleration for the mechanical oscillator in response to the incident for each of said values of the natural frequency and damping coefficient, the determination module 218 being configured to deliver the specification comprising the sizing accelerations and the corresponding natural frequency and damping coefficient values.

Although the present invention has been described with reference to specific exemplary embodiments, modifications can be made to these examples without departing from the general scope of the invention as defined by the claims. For example, one embodiment has been presented in relation to a motor manufacturer and an equipment manufacturer. However, the team responsible for the overall dynamics and the team responsible for the sizing of the equipment can work within the same structure. In addition, although the method for establishing a specification has been presented in a certain order, some steps of this method could be reversed without this affecting the implementation of the method. Furthermore, individual characteristics of the various illustrated/mentioned embodiments can be combined in additional embodiments. Consequently, the description and the drawings should be considered in an illustrative rather than restrictive sense.

The invention claimed is:

1. A method of manufacturing equipment to be mounted on a turbomachine structure that includes a decoupler booster, the method comprising:

- implementing, via one or more processors of a sizing specification device, a process for establishing a sizing specification for the equipment including:
  - selecting, via the one or more processors, incidents including (i) a shock on the turbomachine structure and (ii) a decoupled mode, wherein the shock represents an impact beyond 1000 g for a duration of three milliseconds, and wherein g represents the acceleration of gravity;
  - simulating, via the one or more processors, a presence of the equipment on the turbomachine structure, at an attachment point, based on implementations of a mechanical oscillator having a natural frequency and a damping rate;
  - varying, via the one or more processors, at least one of the natural frequency and the damping rate according to at least two respective values; and
  - determining, via the one or more processors, sizing accelerations for the mechanical oscillator in response to the shock and the decoupled mode, based on each of the at least two respective values for the at least one of the natural frequency and the damping rate;
- determining an initial sizing for the equipment using a modal decomposition of the equipment by a finite element method and based on the determined sizing accelerations for the mechanical oscillator;
- calculating a design natural frequency and a design damping rate of the equipment according to the initial sizing;
- determining a performance capability of the equipment according to the initial sizing to withstand a design sizing acceleration that corresponds to the design natural frequency and the design damping rate;
- manufacturing a specimen of the equipment according to the initial sizing;
- mounting the specimen of the equipment on the turbomachine structure;
- testing the turbomachine structure on which the specimen of the equipment is mounted based on subjecting the turbomachine structure to the incidents including (i) the shock and (ii) the decoupled mode, and based on measuring a dynamic response of the turbomachine structure using a plurality of accelerometers in response to the incidents;
- determining sizing accelerations for the specimen of the equipment based on the measuring of the dynamic response of the turbomachine structure using the plurality of accelerometers;
- determining an adjusted sizing for the equipment based on the performance capability and the determined sizing accelerations for the specimen of the equipment;
- manufacturing the equipment according to the adjusted sizing; and
- assembling the manufactured equipment to the turbomachine structure that includes the decoupler booster.

2. The manufacturing method according to claim 1, wherein the determining of the sizing accelerations for the mechanical oscillator is carried out by digital simulation.

3. The manufacturing method according to claim 2, wherein the digital simulation includes modeling by a finite element process.

4. The manufacturing method according to claim 1, wherein the turbomachine structure represents a nacelle and is partitioned into a plurality of areas, and wherein the determining of the sizing accelerations for the mechanical oscillator includes determining sizing accelerations in at least two areas of the plurality of areas.

5. The manufacturing method according to claim 1, wherein the sizing accelerations for the mechanical oscillator include a maximum acceleration of the mechanical oscillator, taken on all possible azimuths of the attachment point, in response to the incidents, optionally increased by a predetermined margin.

6. The manufacturing method according to claim 5, wherein the maximum acceleration is a radial acceleration.

7. The manufacturing method according to claim 1, wherein the sizing accelerations for the mechanical oscillator include a radial acceleration.

8. The manufacturing method according to claim 1, wherein a mass of the equipment is less than or equal to 5% of a mass of the turbomachine structure, wherein the mass of the equipment is optimized, and wherein mounting the specimen of the equipment on the turbomachine structure includes mounting the specimen of equipment radially inside the turbomachine structure.

9. The manufacturing method according to claim 1, wherein a mass of the equipment is low enough such that, whatever its natural frequency, an acceleration at the attachment point does not differ by more than 10% between a case where the equipment is present and a case where the equipment is absent.

10. The manufacturing method according to claim 1, comprising obtaining a dynamic response of the turbomachine structure in response to the shock before the determining the sizing accelerations for the mechanical oscillator in response to the shock.

11. The manufacturing method according to claim 1, wherein the incidents include a loss of a rotor element of a turbomachine.

12. The manufacturing method according to claim 1, wherein the damping rate is non-zero.

13. The manufacturing method according to claim 1, wherein the attachment point is the sole attachment point of the equipment.

14. The manufacturing method according to claim 1, wherein the mechanical oscillator has one degree of freedom.

15. The manufacturing method according to claim 1, wherein the sizing specification includes a graphic representation, and wherein the shock includes an impact of a rotor element of a turbomachine on a casing of the turbomachine.

16. The method of manufacturing according to claim 1, wherein determining the performance capability includes determining the performance capability to withstand the design sizing acceleration corresponding to the design natural frequency and the design damping rate based on the sizing accelerations of the sizing specification.

17. The method of manufacturing according to claim 1, further comprising:

determining, for each natural mode of the equipment and within a predetermined spectral range, a respective field of maximum stresses in the equipment in response to determining the sizing accelerations.

18. The method of manufacturing according to claim 17, wherein the mechanical oscillator has only one degree of freedom.

19. The method of manufacturing according to claim 18, wherein the natural frequency of the mechanical oscillator is 10 kiloHertz.

* * * * *